United States Patent

[11] 3,626,187

[72] Inventor Barton H. Laney
 Deerfield, Ill.
[21] Appl. No. 792,717
[22] Filed Jan. 21, 1969
[45] Patented Dec. 7, 1971
[73] Assignee Nuclear-Chicago Corporation
 Des Plaines, Ill.

[54] PULSE-HEIGHT ANALYSIS IN SCINTILLATION COUNTING
 31 Claims, 21 Drawing Figs.
[52] U.S. Cl. .................................................. 250/71.5 R,
 250/83.3 R
[51] Int. Cl. ...................................................... G01t 1/20
[50] Field of Search ........................................... 250/71.5,
 106 SC, 83.3

[56] References Cited
UNITED STATES PATENTS
| | | | |
|---|---|---|---|
| 3,320,419 | 5/1967 | Thomas et al. | 250/106 SC |
| 3,388,254 | 6/1968 | Haller et al. | 250/71.5 |
| 3,484,703 | 12/1969 | Thieberger | 250/71.5 |

*Primary Examiner*—Archie R. Borchelt
*Attorneys*—Leonard G. Nierman, Walter C. Ramm and Lowell C. Bergstedt

ABSTRACT: Coincident output pulses of a plurality of photomultipliers are selected for counting on the basis of relative amplitude as well as sum. Improvement in background and isotope resolution is obtained in liquid scintillation counting. Pulse-height analysis circuits incorporating the improvement are described.

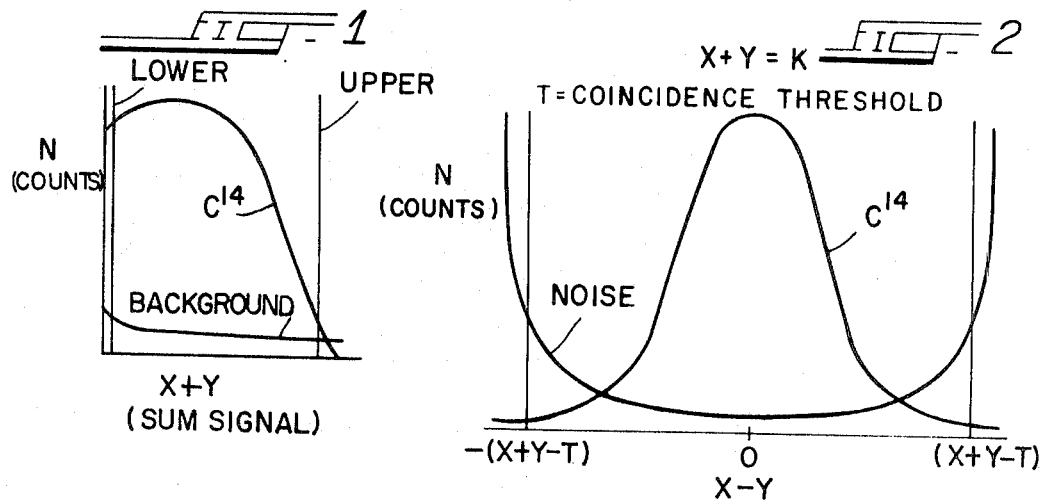
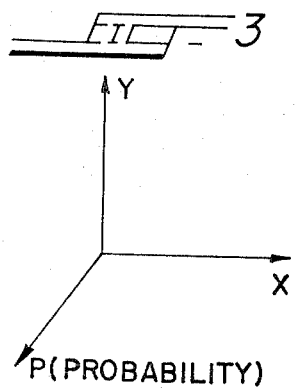
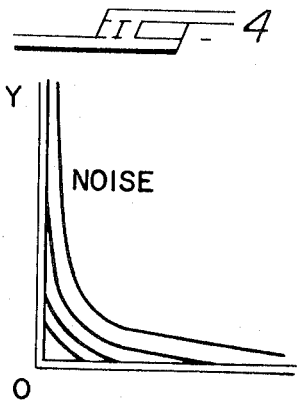
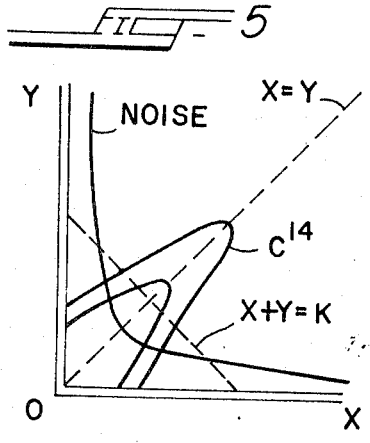
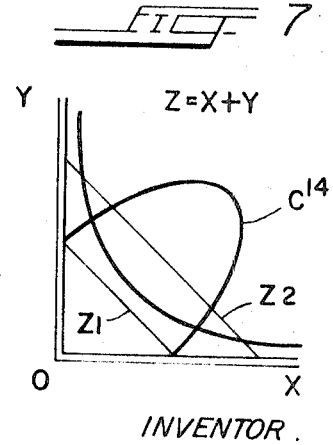
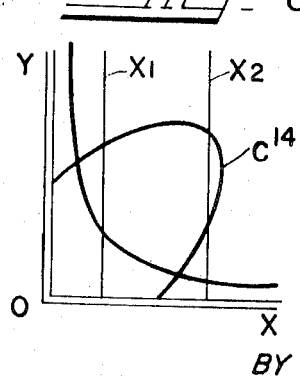
INVENTOR.
BARTON H. LANEY

INVENTOR.
BARTON H. LANEY

INVENTOR.
BARTON H. LANEY

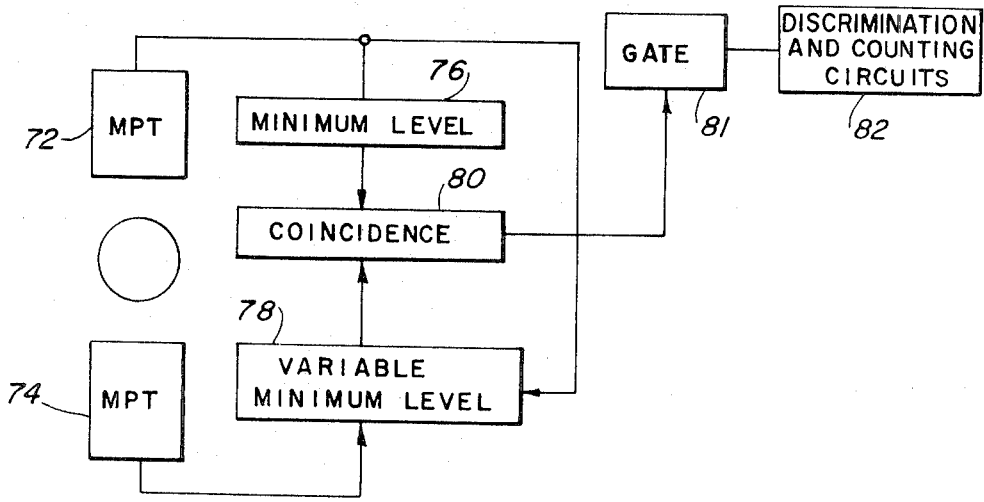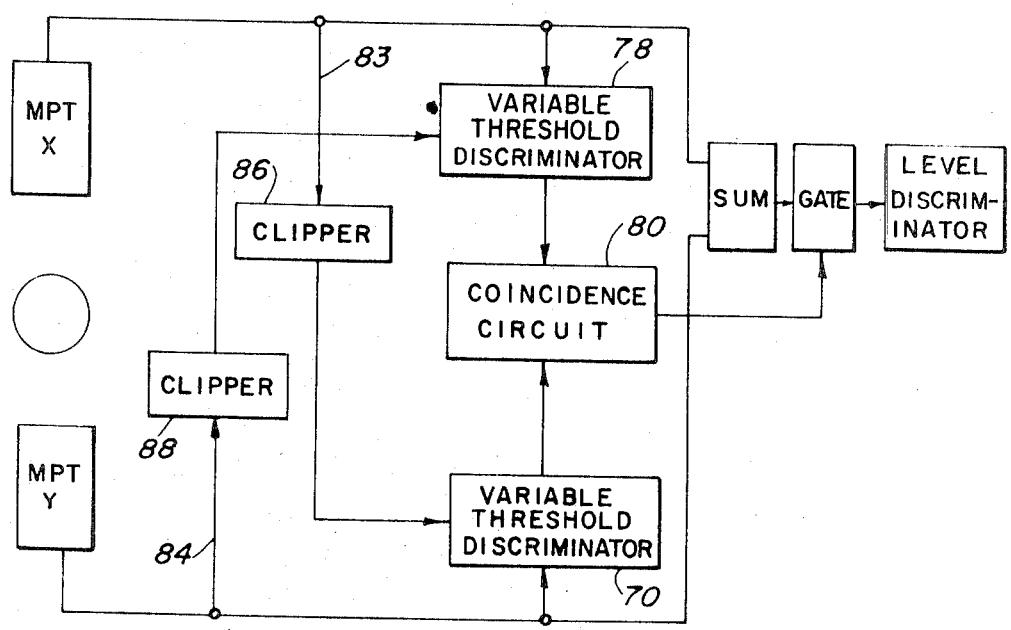

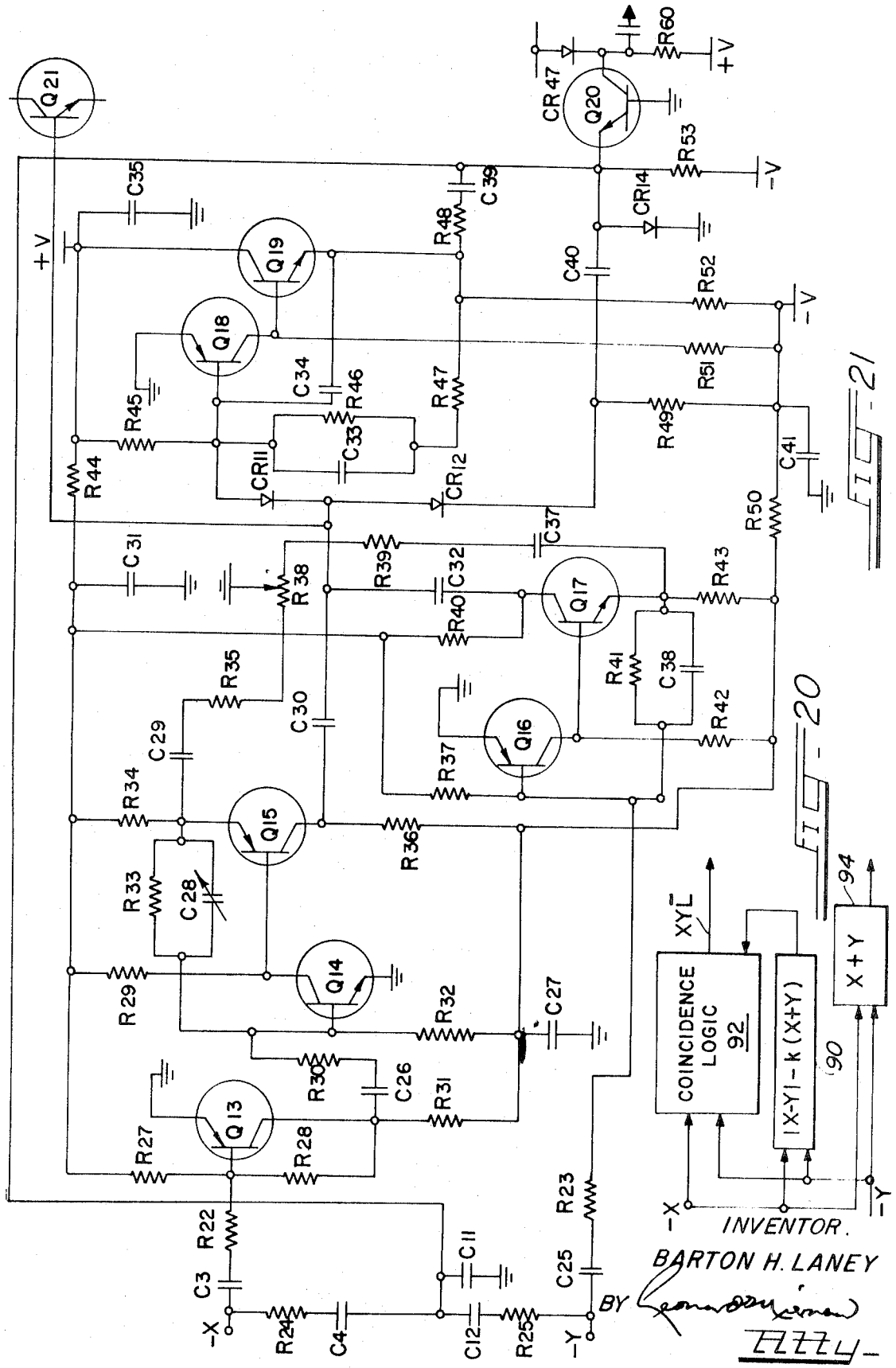

PULSE-HEIGHT ANALYSIS IN SCINTILLATION COUNTING

The present invention relates to methods and apparatus for detection and measurement of low-level light pulses, and particularly for the detection and measurement of scintillations produced by beta-emissions in liquid scintillation counting.

As is well known, the efficient counting of low-energy beta activities by liquid scintillation requires the counting of photomultiplier signal pulses of the same low order of amplitude as internally produced noise pulses. To discriminate against noise pulses, a plurality of photomultipliers, normally two, are used, and noncoincident pulses are rejected as attributable to noise. In basic coincidence counting, one of the multipliers is used solely as a "coincidence tube" for gating the transmission of pulses from the other, which serves as the primary detector or transducer whose output is employed in amplitude selection. Precision commercial liquid scintillation counting equipment also provides for "pulse summation," a symmetrical mode of operation in which the gains of the two tubes are balanced and the pulse outputs summed to form an overall output signal pulse, in addition to employing the coincidence of the individual output pulses for gating the passing of the summed pulses. The summed signal has long been known to be more truly representative of the amplitude of the light pulse producing the coincident output pulses, particularly in the case of very weak pulses; however unsummed operation is sometimes preferred for certain measurements.

Amplitude analysis of the coincidence-gated signal pulses is normally performed by employment of lower-level and upper-level discriminators connected in anticoincidence to count only the pulses of amplitudes within the "window" thus formed. Controls for selecting these discriminator levels, and also the minimum level of the output of each tube required to form an accepted coincidence, are provided for selection by the user of desired values. Thus in the summation systems heretofore known, the criteria for acceptance of a pulse for counting are ($a$) the amplitude of each of the coincident pulses must exceed a preselected fixed threshold value and ($b$) the sum of the amplitudes must lie between preselected fixed minimum and maximum values (the minimum value criterion being essentially eliminated as a separate factor of rejection where it is set at such a low value that it excludes nothing passed by the coincidence system). In unsummed operation the criteria are the same except that criterion ($b$) is applied to the output of only one tube, the coincidence tube frequently being run at higher gain for such operation.

The use of these criteria in liquid scintillation pulse-height analysis has been conventional for many years, and has, prior to the present invention, been accepted as producing the best possible discrimination between signal and noise in low-energy liquid scintillation counting, although residual noise pulses necessarily remain. By raising the minimum level of amplitude which is accepted as forming a coincidence, the noise background existing in any "window" is reduced, but such reduction is accompanied by a reduction in the counting efficiency for weak scintillations. Much effort has been devoted to improvement of photomultipliers as regards noise reduction, and the better liquid scintillation systems normally incorporate provisions for refrigeration and other precautions designed to minimize photomultiplier noise. The index or figure of merit of a liquid scintillation system in the counting of a low-energy isotope is normally taken as the factor $E^2/B$, where E is the efficiency and B is the background, although the index $E/B$, the mere ratio of efficiency to background, is sometimes used. True background due to cosmic rays, natural radiation from materials of construction, etc., is normally minimized by appropriate shielding, selection of materials for minimum inherent radiation, and similar precautions. Such sources of background have long since been reduced in high-sensitivity commercial equipment to the point where residual noise pulses constitute the primary source of counting background for measurements on low-energy isotopes.

The present invention may be summarily described as lying in the finding that the pulse analysis systems of the type long in universal use neglect information content of the individual multiplier output amplitudes which is highly useful, particularly in rejecting many more noise pulses without correspondingly affecting counting efficiency, notably in the case of carbon -14. (As later discussed the information is also useful in distinguishing, on a statistical probability basis, between isotopes in plural-isotope counting, and additionally in reducing the scintillation background produced by true background radiation.) The present invention may be viewed either as the addition of further criteria to those mentioned as (a) and (b) above, or as adding an interdependency between these criteria of acceptance, heretofore independent.

In one basic form of the invention, noise-pulse pairs exactly simulating signal-pulse pairs with the methods and apparatus of analysis or discrimination heretofore used are segregated from signal-pulse pairs with substantially high statistical reliability by employing the relative amplitudes of the coincident pulses as an additional criterion. The relative size of the individual pulses of noise coincidences is found to have an entirely different probability distribution than the relative size of true scintillation pulses producing the same summed amplitude.

For coincident pulses of any given sum, the contributions of the respective tubes to that sum are not constant in all occurrences, but are statistically distributed, both in any large sample of signal pulses and in any large sample of noise pulses. However, true signal pulses of all but the very smallest summed amplitude have a probability function or curve which has a single maximum substantially at pulse equality (with the matched multipliers and operating conditions of a summation system), since the basic mechanism of pulse-production involves a generally equal division of the light energy of the scintillation between the two tubes, the variations from exact equality being caused primarily by such factors as statistical fluctuations in phototube response, etc., the relative magnitude of which is small except when the light pulse is itself very weak. On the other hand, equal coincident noise pulses from the respective tubes are relatively rare for all but the smallest aggregate amplitudes, the probability curve in this case for pulses of any given substantial sum having maxima at great inequality of the coincident pulses; coincident pulses of appreciable sum occur predominantly with a relatively large pulse from one tube and a relatively small pulse from the other, due both to the shape of the noise-pulse-amplitude spectrum in each tube and to coincidences which are not in fact merely coincidental, but are caused by inducement of a small response in one tube to light-emission produced in occurrence of a discharge noise pulse in the other. Thus by merely rejecting pulse pairs of predetermined disparity, a substantial portion of noise background pulses heretofore counted along with signal pulses of substantial amplitude can be eliminated without appreciable reduction in counting efficiency for true scintillation events and this may be done easily by a simple addition to conventional sum-discrimination equipment to produce a signal corresponding to the absolute difference between the signals and feeding this signal to any conventional type of amplitude-discriminator, the latter being connected in anticoincidence with the conventional "window" to block counting of summed pulses of excessive differential.

Although the addition of such a simple "maximum difference discriminator" controlling the pulse transmission in a conventional pulse-sum analysis system produces substantial improvement by selection of proper limit of differential empirically, still further improvement may be effected by refinements of the basic principle resulting from study of the factors determining the maximum differential between coincident pulses which should be permitted in accepting a sum-pulse as one to be counted. Any given limit of permitted differential will have a greater effect on the efficiency of counting large signal pulses than of small signal pulses, i.e., the probability that a true signal pulse of large amplitude will exceed a particular absolute differential in the contributions of the two tubes is substantially greater than the probability that a true signal pulse of smaller sum amplitude will have such a differential of the contributions. Accordingly, the permitted differential should not be set the same for all energies of counted radiation. Where resetting of the differential limit is objectionable, or where multiple radiation energies are to be counted without introducing the complexity of multiple separate circuits, the simple differential criterion of discrimination is advantageously replaced by one which has the permitted limits of difference between the contributions of the two tubes to any given sum an increasing function of the sum. For reasons later apparent, discrimination in which the permitted differential increases linearly with the sum of the two individual coincident pulses may be called "skew" differential discrimination. When added to a conventional upper-and-lower sum-discrimination system, a skew differential discriminator is capable of appreciable improvement in the ratio of efficiency (or its square) to background in the counting of a number of isotopes without resetting.

It will facilitate understanding of the invention, and of the further discussion, to point out more exactly the meaning of certain terms just used. In a conventional pulse-summation liquid scintillation system, it is a requirement for accepting pulses of any sum that each be of at least the threshold coincidence value, which is the same for both tubes and the same for all sums. It will be seen that in a very broad theoretical sense this in itself might be called a maximum-differential discrimination system since the maximum permitted differential between individual pulses of any given sum is the sum less twice the threshold value, and the maximum permitted differential accordingly varies with the sum by a relation which preserves a mere constant difference between any sum and the maximum permitted differential between the individual pulses producing that sum. The discussion of the present invention herein will be understood to exclude such strained interpretation of the terminology employed, and the maximum permitted differential as herein discussed will be understood to refer to a maximum differential which is less, over at least a substantial portion of the range of permitted sums, than the sum minus the unvarying minimum individual pulse threshold values of the prior art systems.

As will be obvious, the equality or inequality above discussed in terms of differential of the pulses may equally well be described in terms of ratio of the pulses.

When the detailed mode of obtaining the improvement is more closely examined, it becomes apparent that the basic teachings of the invention are capable of further refinement to produce discrimination between accepted pulses and rejected pulses which is even more efficient in optimizing performance than in the case of the simple additions just described. It is advantageous for ease of understanding to consider separation of undesired pulses from signal for each particular pulse sum within the range of sums to be accepted. (It will be understood that "sum" as here used necessarily means a small but finite unit range of sums.) If selection is approximately optimum for each individual sum, when properly weighted for relative counting-rate, the best possible overall ratio of desired to undesired acceptance over the range of sums will result.

In determining the optimum maximum permitted inequality (differential, ratio, etc.) for any sum, there enter two factors of relative probability, first, the probability distribution or spectrum of relative pulse sizes of the coincident undesired pulses and coincident desired pulses, respectively, which produce that particular sum as a function of inequality, and second, the overall "efficiency" of that particular sum for the detection of desired and undesired events. The general shapes of the probability distributions of signal pulses and noise pulses have already been generally discussed, and one manner of use of this information described. However the same principles of selection of coincident pulses from the individual photomultipliers may also be used to improve the statistical separation of pulses produced by different isotopes and also of pulses produced by background radiation.

As will hereinafter be more fully explained, the use of the two probability factors mentioned to produce the closest approach to optimum counting conditions for each sum normally produces a narrowing or reduction of the permitted differential at summed amplitudes corresponding to the highest portion of the amplitude spectrum of the isotope being counted, and the pulse-height analysis is thus desirably performed, for optimum results, with substantial reduction of the permitted differential between the individual coincident pulses in the region of the relatively infrequent maximum summed true signal pulses.

The acceptance criteria for pulses of any given sum discussed above, rather than being stated in terms of permitted inequality, may also be described as varying the threshold value required for counting in each tube (heretofore the same for all sums) in accordance with the value of, and in the same direction as, the pulse from the other tube or of the sum, and the variation (if any) of maximum permitted differential with sum may be described as the "shape" of the curve (or line) of threshold as a function of sum. From the standpoint of the general method of the invention, such descriptions are wholly equivalent, being mere differences in mode of description of the concept. From the standpoint of the apparatus aspect of the invention, however, the implementation suggested by such differing descriptions of the same method can result in substantially different constructions of novel apparatus which are nevertheless closely similar in ultimate function or purpose and may be considered wholly equivalent as regards the broader teachings of the apparatus aspect of the invention.

As later more fully seen, the specific aspects of the pulse-height-analysis method thus far discussed may be considered, more or less, as providing improvement on statistically selective discrimination against the pulses of the general character heretofore eliminated from the count by the criteria (or apparatus) for pulse-counting acceptance generally known as "-coincidence threshold" and "upper-level sum discrimination" in conventional "window" discrimination. Further improvement, using the probability information in the individual multiplier outputs, is obtained by substantial alteration of the criteria for acceptance generally known as "lower-level discrimination," i.e., by altering the criteria for rejection of pulses of overly small sum. Here the difference between the shape of the equality distribution curves of desired and undesired pulses of any given sum may be again utilized to produce improvement on the mere lower-level sum rejection heretofore used, by incorporating the difference as an additional criterion of acceptance in the region of lowest amplitudes to be accepted. Since coincident noise pulses of any given sum will have a relatively low probability of being of equal amplitude (even though far less so than at larger sum values), lower-level discrimination which excludes the counting of pulses of greater than a maximum differential, properly selected for each sum value, can reduce the ratio of background to some degree even in sum regions so low that the peaking of signal-pulse efficiency distribution at equality is very small. In this case, as later explained, a lower-level rejection criterion which includes a range of minimum sums, rather than a single sum-level as heretofore, and increases the limits of accepted differential from a minimum value (or zero) at the minimum accepted amplitude sum will produce improvement in statistical separation of signal from noise of which the mere sum criterion is wholly incapable.

In addition to utility in discriminating between signal pulses and noise pulses, the relative pulse-height information of the coincident pulses may be employed to improve the resolution or separation of isotopes of different energies counted in separate counting channels. Heretofore such discrimination has likewise been performed on mere summed amplitude. In accordance with the present invention, there is no single sum which defines the upper limit of acceptance of the lower-energy isotope or the lower limit of acceptance of the higher-energy isotope, as heretofore. Instead, the criteria for acceptance also include the relative values of the individual pulses for any given sum, and the value of the sum is only one of the parameters of pulse selection.

The improved analysis method of the invention, both in its general aspects and in its more specific aspects as discussed later, may be carried out with a variety of specific apparatus. In principle, any of the examples mentioned above may be practiced with apparatus which is in itself conventional. For example, the coincident pulse pairs from the individual multipliers of a conventional phototube system having no associated discrimination circuits may be used to select and reject counts with use of a suitably programmed computer, after digitizing the amplitudes of the pulses. Another form of known equipment which may be used is a multichannel analyzer of large capacity. Alternatively, the outputs in the counting interval may in principle be also recorded on tape and subsequently counted in a conventional coincidence-summation system in a series of playbacks counting the pulses of successively manually set small amplitude-sum ranges, with corresponding manual increase of the minimum coincidence-acceptance amplitude for each tube for each successively higher range of sums, or other relatively cumbersome means employed. However, for most purposes such practice of the method is relatively impractical, and pulse-discrimination apparatus specifically designed for the method aspect of the invention is provided as a further aspect of the invention, as already mentioned in the case of addition of difference (or ratio) discrimination to prior art systems. In a more advanced form of the invention, the sum and equality information is combined and utilized in wholly interdependent fashion by generating a pulse signal whose amplitude is a more complex function of the two coincident analog signal amplitudes, selecting or rejecting coincident pulses on the basis of the amplitude of this latter pulse in a manner generally similar to that in which sum-pulses were heretofore employed.

More complete understanding of the above summary, together with further teachings of the invention and their purpose and advantage, will be obtained by referring to the annexed drawing, in which:

FIG. 1 is a conventional representation of the pulse-height spectrum of carbon-14 and background pulses in a typical summed-signal system of the prior art, showing the upper-level and lower-level discrimination values employed in forming a typical counting window;

FIG. 2 is a graphical representation of a generally similar probability or spectrum function for carbon-14 and noise, respectively, for a given value of the sum in the spectrum of FIG. 1, with indication of the noise-discrimination effect of conventional coincidence-threshold provision;

FIG. 3 is a schematic illustration of a three-dimensional coordinate system for representation of signal-pulse and background spectra with individual pulses from respective photomultipliers as independent variables;

FIG. 4 is a representation of the probability distribution of amplitudes of coincident noise pulses from the individual tubes;

FIG. 5 is a similar representation for carbon-14 pulses, along with an exemplary noise-pulse curve;

FIG. 6 is a graphic representation of the operation of a conventional unsummed coincidence system;

FIG. 7 is a similar representation of the operation of a conventional summed-pulse discrimination system;

Figure 8:
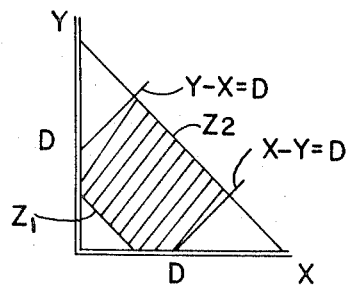
Figure 9:
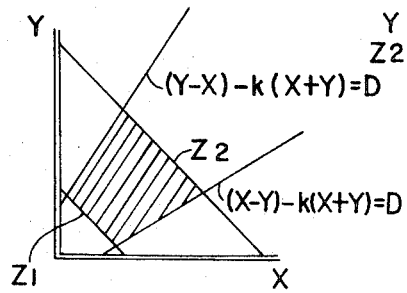
Figure 10:
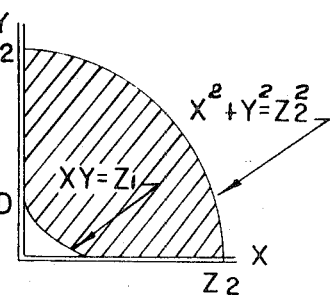
Figure 11:
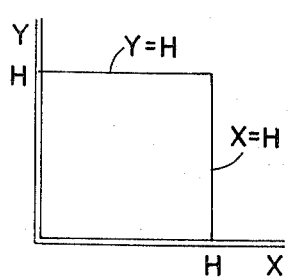
Figure 12:
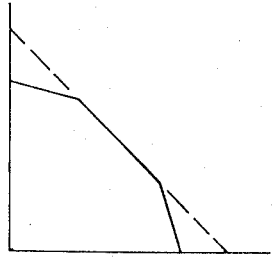
Figure 13:
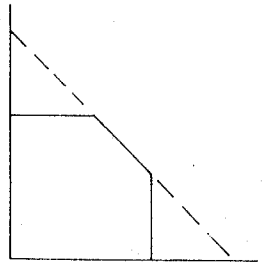
Figure 14:
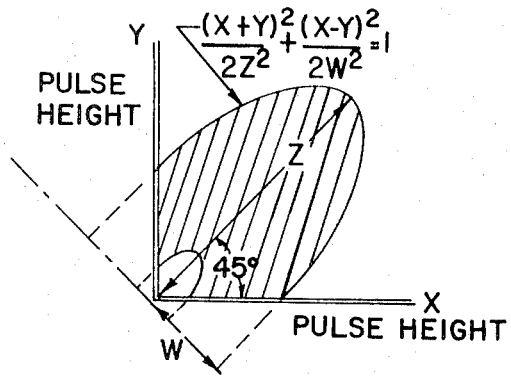
Figure 15:
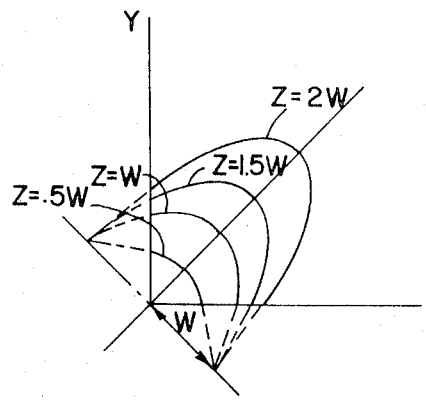
Figure 16:
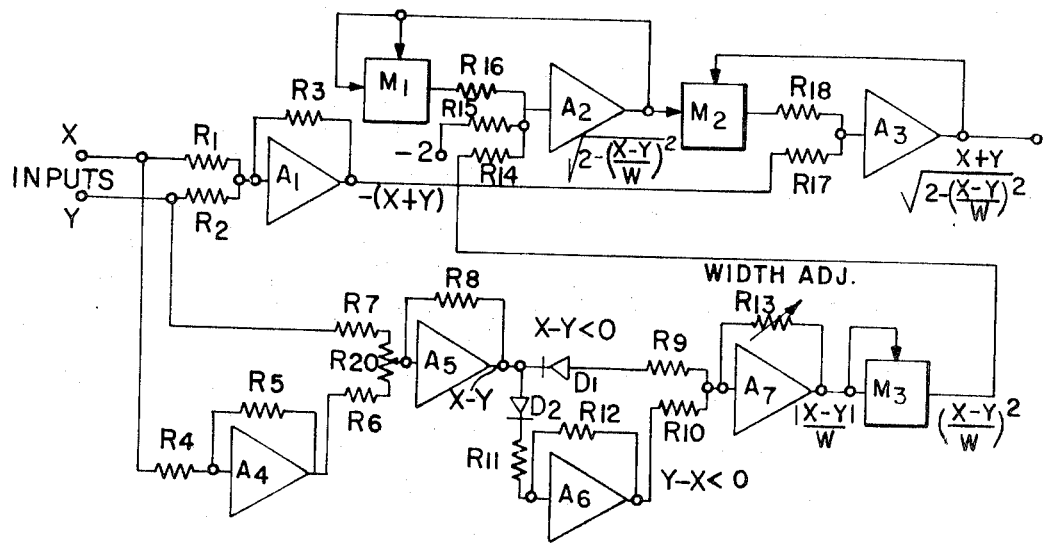
Figure 17:
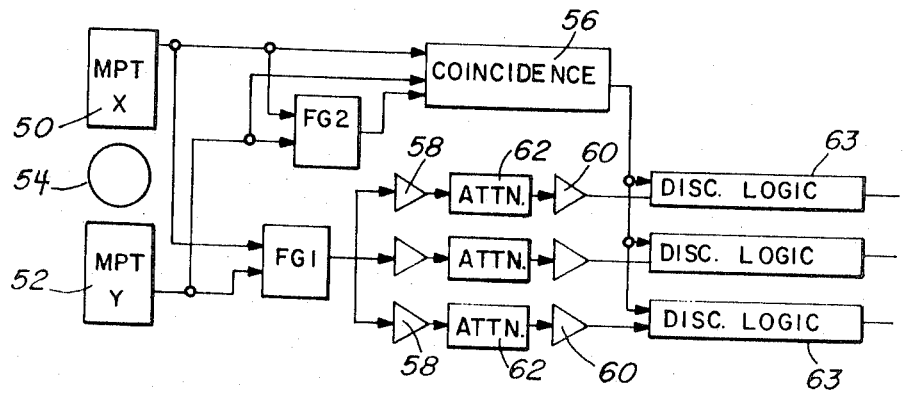

FIG. 8 schematically illustrates the effect of addition of a difference discriminator on the operation shown in FIG. 7;

FIG. 9 schematically illustrates the effect of a "skewed" difference discriminator;

FIG. 10 shows, in similar representation, a manner of applying the invention to the counting of tritium radiation;

FIGS. 11, 12, and 13 schematically illustrate various discrimination criteria of simple types embodying the teachings of the invention;

FIG. 14 is a generally similar plot illustrating another embodiment of the invention;

FIG. 15 is a graphic illustration of a manner of expressing discrimination criteria as functions of amplitudes;

FIG. 16 is a schematic diagram of an analog function generator for implementing FIG. 15;

FIG. 17 is a block diagram of an overall liquid scintillation counting system employing the function generator of FIG. 16;

FIG. 18 is a schematic block diagram of an exemplary embodiment of the invention as applied to an unsummed counting system;

FIG. 19 is a schematic block diagram of a further embodiment of the invention;

FIG. 20 is a fragmentary block diagram of another embodiment of the invention; and FIG. 21 is an exemplary circuit diagram of an element of the embodiment of FIG. 20.

FIG. 1 shows the conventional representation of pulse-height spectra of background and scintillation pulses produced by carbon-14 in a typical liquid scintillation counting system, along with the "counting window" formed by upper and lower discriminator levels. Such spectra have long been familiar to users and designers of liquid scintillation equipment, but a brief discussion of certain aspects will be useful in understanding the present invention.

The pulse-height spectrum of an isotope in liquid scintillation counting generally (but not exactly) reproduces in shape the energy spectrum of the emitted beta particles converted to light by the scintillation phosphor. The isotope spectrum cannot, of course, be measured directly without the presence of background, but the latter may be subtracted on the basis of the background spectrum measured by use of a scintillating sample with no emitter, and true scintillation background may be analogously isolated from coincident noise pulses by using an "optical-only" sample bottle.

It will be observed that the abscissa axis in FIG. 1 is indicated as "X+Y." The designations X and Y are used in this and the following discussion to indicate the amplitudes of the coincident pulses in the individual tubes of a symmetrical coincidence system.

As shown by the vertical lines in FIG. 1, conventional equipment employs lower and upper discrimination levels which are adjusted by the user in accordance with the particular requirements of the measurement for which the equipment is being used. For gross measurements on beta-emitters of relatively high energy with fairly high emission rates, adjustment is far from critical. However, as sample strength and beta-ray energy are lowered, the selection of proper levels for the window-limits become highly critical in performing measurements to a desired accuracy in a minimum of time.

In the showing of FIG. 1, the ratio of the carbon-14 pulses which fall within the window to the total number of disintegrations occurring in the sample (whatever be its strength) of course constitutes the efficiency of the system for counting the isotope. Both the efficiency and the noise are increased or decreased together by widening or narrowing the window. The highest values of E/B, ratio of efficiency to background, are obtained with relatively narrow windows, selected for any particular desired count-rate. As the window-levels are moved apart, even though the increment of efficiency may bear a lower and lower ratio to the increment of background, the ratio of the square of efficiency to the background increases until the maximum value of this ratio is reached at particular settings of the respective controls beyond which the ratio again diminishes.

It will be seen upon study that in essence the optimization of system performance is inherently obtained by employment of the principles of statistical probability. The graph of FIG. 1 may advantageously be considered as showing probability distribution functions of signal pulses and noise pulses, respectively, and the upper and lower level discriminators may be considered as employing the sum signal information to sort pulses on a probability basis. Pulses of a sum lying within the window are accepted as having a sufficient probability of being true signal pulses and those lying outside the window are rejected as having insufficient probability of being true signal pulses to justify counting. The present invention may be roughly described, in terms of the coordinate system of FIG. 1, as adding a "third dimension" to the usual pulse-height spectrum analysis, based on similar probability sorting using a further item of information actually contained in the X and Y pulses, namely their relative values at any given sum.

In FIG. 2, there are illustrated the spectra or probability distribution functions for carbon-14 and noise pulses, respectively, in what may be visualized as a plane perpendicular to the drawing of FIG. 1, i.e., the probability functions of noise and signal pulses based on relative contribution of the individual tubes at a single value of the sum signal, more or less analogous to a "slice" taken through the plot of FIG. 1 at the abscissa value $X+Y=K$. There are added, in FIG. 2, vertical lines at the positive and negative values of the X−Y abscissa which have the absolute value X+Y−T, where T is the coincidence threshold, i.e., the minimum pulse from either tube which is required to register a coincidence. (It will be seen that the lowest possible value of X+Y in FIG. 1 is necessarily 2T, this being implicit in the statement that only coincident pulses are counted in the conventional summming system.)

As may be predicted from theoretical considerations, and as has been experimentally verified, where the sum signal is substantially greater than 2T, the probability of approximately equal noise pulses is extremely low, while the probability for carbon-14 pulses is maximum in the region of small differential and falls off rapidly with increasing differential. Accordingly, any given sum value shown as accepted in the graph of FIG. 1 may be improved in the "factor of merit" by discriminating on the basis of difference. Such discrimination is of course made, broadly stated, by the value of the coincidence threshold in a conventional system. However, the inadequacy of the coincidence threshold setting for this purpose becomes apparent when it is considered how the exemplary representation of FIG. 2 varies dependent on the selection of the value of X+Y for which the probability distributions are plotted. As the sum value increases, the spread of abscissa values between the coincidence threshold limits shown in FIG. 2 increases. Although the equality peak of the carbon-14 probability curve broadens on an absolute basis (the probability of exceeding any given difference increasing with the sum), the peak becomes sharper as regards isolation from the bulk of the noise pulses within the coincidence threshold limits, and the probability of relatively equal pulses representing a signal pulse rather than a noise pulse increases more and more with increase of the sum. Inversely, at lowermost carbon-14 pulse sums, the curves of probability become much less sharply contrasted in shape, the ratios at zero difference being relatively small at small sums.

With this introduction, showing generally the relationship between the present invention in its broadest aspects and the prior art discrimination methods represented by FIG. 1, explanation of a graphic representation more convenient for use in further description of the present invention will be facilitated. As shown in FIG. 3, the "pulse-height spectrum" serving as the basis for discrimination in the present system is conceptually best represented in three dimensions, i.e., with X and Y, the individual phototube outputs, as independent variables generally corresponding to the sum of FIG. 1, with probability P being a function of these independent variables. For graphical practicality, however, the further graphic representations employ a single X, Y coordinate plane, with "equal probability curves" or contour lines, all points on each curve representing X and Y value contributions having the same probability or frequency of occurrence in the signal-pulse spectrum or noise-pulse spectrum as the case may be. This may best be understood from FIGS. 4 and 5, wherein there is a schematic representation conveying the same general information previously discussed in terms of spectra like FIG. 2 for all values of the sum in FIG. 1.

The form of representation here adopted is analogous to a time-integrated photograph of dots of equal intensity produced by coincident pulses on an oscilloscope screen, each dot appearing at a point in the plane of X and Y values determined by the amplitude of the output pulse from the respective tube. In such a representation of a pulse-height spectrum (which may be directly produced in this fashion), there appear characteristic patterns for the pulses produced by noise and by various isotope scintillations. The probability value in this "three-dimensional spectrum" is represented by density of the dots at any combination of X and Y values, and the graphic representation of each equal-probability contour corresponds to the intersection of the "surface" spectrum with a particular probability value.

In such graphic representations as FIGS. 4 and 5, and the further Figures later to be described, all points of any given X+Y value ($X+Y=K$) lie along a 45° diagonal line (one being shown dotted) corresponding to an abscissa axis represented in FIG. 2, the intersections of any sum-line with successive equal-probability lines representing the probability spectrum of FIG. 2 for that particular sum. The 45° line from the origin ($X=Y$) is representative of pulse equality in the two phototubes.

The general shape of the noise spectrum is shown in FIG. 4. The greatest density of occurrence of the noise pulses is represented by the equal-probability curve nearest the axes, with further equal-probability contours representing lesser densities or probabilities of occurrence.

The equal-probability or equal-density contours of carbon-14 are roughly of the shape shown in FIG. 5, two being shown. As earlier discussed, the shape of the contour is basically determined by the combination of the sum spectrum of FIG. 1 with spectra like those of FIG. 2 for each of the various sum values. Each equal-density or equal-probability curve for carbon-14 is more or less in the shape of a half-oval or ellipse extending symmetrically along the 45° pulse equality line, successively smaller contours representing higher densities. Similar curves (not shown) for higher energy isotopes are, as may be expected from what has already been said, of somewhat different shape when plotted with suitable adjustment of scale, diverging from the 45° equality line with increasing sum value up to sum values in the region of the sum-spectrum peak rather than displaying the more or less parallel (or equal-differential) relation of the lower portions of the carbon-14 curves illustrated. This results from the fact that a conventional spectrum like that of FIG. 1 has, in such cases, relatively few counts of small sum; for an isotope such as phosphorus-32 equal-density curves for very high probability values are closed loops in the region of high sum values.

It will be observed that in FIGS. 4 and 5 and certain of the further Figures, there appear lines parallel with, and slightly spaced from, the coordinate axes. These lines represent the conventional coincidence threshold for the respective tubes.

FIG. 6 portrays, in this manner of presentation, the operation of a conventional basic or nonsummed coincidence system (shown as having symmetry of threshold values and multiplier gains, to simplify illustration), and FIG. 7 shows the operation of a conventional sum system, each showing an equal-density contour for carbon-14 and noise. In FIG. 6, the lower and upper discriminator levels, respectively, for the "-signal tube" output are shown at $X_1$ and $X_2$ and in FIG. 7 the lower and upper levels for the sum signal are shown at $Z_1$ and $Z_2$ (the positions illustrated not being necessarily optimum). Study of FIGS. 6 and 7 will show that it is impossible to approach optimum statistical discrimination between signal and noise by adjustment of discrimination levels in these prior art systems.

In FIG. 8, there is shown in similar representation a simple addition to the sum-system of FIG. 7 by which great improvement can be effected in eliminating noise pulses. As in FIG. 7, pulses of sum greater than $Z_2$ are excluded from counting, as are pulses of sum less than $Z_1$. However, in addition, as shown by the hatched acceptance area, there are excluded all pulses which do not lie between the lines $Y-X=D$ and $X-Y=D$, i.e., all pulses having greater than a maximum permitted differential which is here constant for all sums. Comparison of FIG. 8 with FIG. 7 will show that such a simple addition to the conventional sum-discrimination system greatly reduces the noise pulses with relatively little effect on the signal pulses.

Although the addition of discrimination on the basis of a constant maximum permitted differential, as in FIG. 8, produces substantial improvement in the counting of carbon-14, and can also produce improvement for higher isotopes, any single setting of the differential is wholly unsuitable for use with a variety of isotopes. In FIG. 9 there is shown the operation of a "skewed" differential discrimination system added to the conventional sum-discrimination system. Here the permitted absolute value of the differential increases with the sum, the limits of permitted differential diverging with increasing sum values. The differential limits are described as "skewed" because of the illustrated relation to the rectangular coordinates. As shown by the legends on the skewed acceptance limits in FIG. 9, such discrimination may be accomplished by limiting the absolute value of the resultant obtained by subtracting a fraction $k$ of the sum from the difference, this fraction being selected either by examination of contour data taken for the system (using the oscilloscope technique mentioned or a multichannel analyzer), or by mere empirical experiment. As another example, a constant voltage value C may be added to each of the phototube outputs, and the ratio of X X+C may be generated and the pulse accepted only if the ratio falls between a prescribed number and its reciprocal.

By simple addition to a typical commercial liquid scintillation system of a permanently set skewed differential discrimination circuit producing the acceptance characteristics shown in FIG. 9, there may be achieved a large improvement in $E^2/B$ (both with optimum window settings and with settings producing higher E/B or better dual-isotope separation) in the counting of carbon-14, not only without impairment of the performance for other isotopes, but with the realization of a measurable improvement for other isotope energies.

The greatest performance improvement of this simple form of the invention is obtained in the counting of carbon-14. In the counting of isotopes of successively higher energies, in which higher values of $E^2/B$ can readily be obtained in an ordinary sum-window, the improvement in performance necessarily decreases. At the other extreme, as will now be seen, the best utilization of the invention in the counting of the very low energy radiation of tritium will usually require implementation of the basic method in a manner somewhat more complex than those thus far described.

As was earlier indicated, the peaking of the spectrum of scintillation signal pulses of a given sum in the region of equality, shown in FIG. 2, diminishes as smaller and smaller sum pulses are examined, the statistical fluctuations of individual tube outputs becoming a larger and larger factor with smaller light pulses. Since the tritium spectrum has a substantial component in the region of light intensities representing the threshold of theoretical ability to produce one electron from each photocathode of most available multipliers, the individual pulses produced by a given light intensity in this region are usually so dispersed in amplitude that the equal-density contours of the upper portion of the two-variable tritium spectrum are generally in the form of concentric circular arcs, one of which is shown in FIG. 10 as the upper limit of the hatched acceptance zone of a tritium counting system utilizing the invention. (The coordinate scales represented in FIG. 10 are of course greatly expanded as compared with those employed in the representation for carbon-14). If the illustrated contour is taken to correspond with the extreme upper end of the tritium spectrum, the advantage of shaping the acceptance limit along this circular arc, as compared to any intersecting chord described by a sum-level, will be obvious in view of the high noise-pulse density at low levels. Such a discrimination characteristic may be obtained by analog computation of the sum of the squares of the individual tube outputs and comparison of this sum with a fixed maximum discrimination level, as indicated by the legend in the drawing. As shown in FIG. 10, the lower discrimination limit may, as also indicated by the legend in the drawing, be fixed by analog multiplication of the two pulse values and comparison of the product with a minimum value. In this case there is a range of lower-level sums in which the permitted inequality increases with the sum, while the opposite is the case in the upper-level discrimination.

It will be obvious upon study that the characteristics of FIGS. 8 through 10 are merely exemplary of a large number of manners of obtaining improved noise discrimination as compared with sum-discrimination systems in accordance with the invention. In FIG. 11 is shown an acceptance restriction characteristic wherein the coincident pulses are excluded from counting if either exceeds a fixed value. With a suitably selected limit, the addition of this to the conventional sum system of FIG. 7 will produce appreciable noise reduction for carbon-14 counting, although less than in the case of the differential limits of FIGS. 8 and 9; such a limit must not, of course, be effective in the counting of any isotope of higher energy than that for which it is set. FIG. 13 shows the interaction of such fixed individual limits with an upper-level sum discriminator. Such discrimination criteria, it will be noted, represent a rough approximation to the upper-level equal-probability characteristic of tritium pulses as shown in FIG. 10, and an even closer approximation of this may be obtained by canting the individual pulse limits as shown in FIG. 12.

It will become apparent after study that exact optimization of discrimination against noise on a probability basis is extremely complex, particularly in the region of smallest accepted sums. Theoretically, there can be defined a fully optimum boundary between signal pulses and noise pulses. In such a theoretical optimum boundary, the maximum permitted difference or ratio of X and Y pulses for every sum value would lie at the points at which either expansion or contraction of the acceptance zone would reduce the overall factor of merit. Determination of the theoretical optimum pattern of division between acceptance and rejection can in principle be made for each isotope with any given system. However, the delineating of the boundaries of the acceptance zone which is theoretically optimum for any given set of counting conditions is an extensive experimental task which is not in general warranted, both because the design of readily settable discriminator systems capable of forming complex-shaped acceptance areas in the X, Y plane is difficult and because the added benefit obtained as compared with simpler embodiments of the invention, already described and to be later described, is relatively small, particularly when it is observed that in practical counting, there are variables such as sample quenching, which will be mentioned later.

Thus far, the invention has been discussed primarily in connection with discrimination between signal pulses and noise pulses. However embodiments already described are also of utility in probability discrimination between isotopes, as in the counting of dual-labelled samples, notably with carbon-14 and tritium. An important reason for the use of summation of the pulses in a symmetrical coincidence arrangement in modern liquid scintillation equipment has been the belief, prior to the present invention, that descrimination on the basis of sum provides the best isotope separation, i.e., the highest possible ratio of tritium efficiency to carbon-14 efficiency in a tritium counting channel and the highest carbon-14 efficiency in a tritium-free carbon-14 counting channel. As shown by the present invention, this is not the case. Although sum-discrimination sharpens the energy discrimination as compared with one-signal operation, the probability considerations which underlie the present invention show that substantial further improvement can be made.

As already discussed in connection with FIG. 10, equal-density contour curves for tritium in the X, Y plane are approximately circular arcs. The equal-density carbon-14 contours in this region of very small pulses (not shown in the carbon-14 diagrams earlier described, because of the difference in scale) are of the same general (although not identical) shape. Under these conditions, the conventional upper tritium level sum discrimination (a diagonal line not shown in FIG. 10) produces only a crude compromise approach to optimum acceptance criteria, since the best sum-discrimination level for approximately equal X and Y pulses is higher than the best sum-discrimination level for very unequal pulses. If the lower discrimination level of a carbon-14 counting channel is shaped in accordance with the equal-density contour of the tritium, it can be given a somewhat higher efficiency for carbon-14 while still excluding all tritium, than can be done with a mere sum-level discriminator. The ratio of the efficiency of the tritium counting channel for tritium to that for carbon-14 can also be increased somewhat by proper shaping of the upper level of this channel, as later mentioned.

The principle of improvement of isotope separation by shaping the adjoining boundaries of the discrimination characteristic or acceptance area in the X, Y plane to appropriate curves may also be used advantageously in separating carbon-14 from higher-energy isotopes such as phosphorus-32, or in any similar energy-discrimination, although the improvement is most marked in the case of tritium and carbon. Further such shaping at the top-most sum-amplitudes of even a single isotope such as carbon-14 or higher-energy isotopes can produce improvement of performance, as now to be seen.

The improvement obtainable from shaping the upper-level discrimination characteristic to taper in the region of maximum pulse-heights is best explained by returning first to FIG. 1. The region of maximum sum-pulse-heights of carbon-14 is well beyond the amplitudes at which the noise having the distribution pattern earlier discussed is highly important. The spectrum of total counting background, although falling off rapidly at low amplitudes, thereafter decreases very slowly. This gradually decreasing region of background, which extends to the highest beta-induced pulse-heights, is primarily due to scintillation background resulting from cosmic rays, residual radiation in materials of construction, and similar sources. This radiation background may enter the detection system in one of two ways. First, it may interact directly with the multiplier structure, producing pulses by production of electron emission. Such an occurrence will here be considered as noise. The second manner of entering the detection system is by production of light pulses in the scintillating liquid. Because of the difference in general type of radiation energy, there are differences in the mechanism by which energy is converted to light, but these are not known to be relevant to the present discussion. For present purposes, the true radiation background is considered as producing a relatively flat spectrum of scintillation intensities extending throughout the entire range of beta-energies, an individual scintillation of any given intensity being the same whether produced by a background event or a signal event. Discrimination against this type of background is the primary purpose served by the upper-level discriminator of a conventional counting window in the counting of high-energy isotopes.

Since a background scintillation of any given intensity is identical with a signal scintillation of the same intensity, it might at first appear impossible to produce in the detection and counting system any change in the ratio of signal pulses to true background pulses which is better than can be obtained by conventional maximum-sum discrimination. Were there exact correspondence between light-intensity and pulse-sum output in each scintillation event, this impossibility would in fact exist; were this the case, any ratio of scintillation signal to scintillation background produced at a particular sum-value would be constant for all values of the differential. Thus there would be no gain whatever in ratio of signal to background by limiting the permitted differential whether to roughly follow an equal-probability contour or otherwise. As will now be shown, however, this ratio can actually be changed by narrowing the permitted differential in the region corresponding to the top end of the spectrum of the isotope being counted, where the amplitude spectrum of the isotope (carbon-14 in FIG. 1) is rapidly diminishing while the amplitude spectrum of the noise is constant or level over the same interval.

Let there first be considered the limiting case of the maximum sum amplitude of the carbon-14 spectrum of FIG. 1, i.e., the sum at which the counting rate becomes zero. These pulses do not result from light scintillations which are capable of producing this sum as the average amplitude, but represent maximum deviations in the same direction in the output of both phototubes in response to the maximum-intensity scintillation in the carbon-14 spectrum. A spectrum of carbon-14 pulses like that of FIG. 2 for this sum would appear as only a single "pip" at the condition of pulse equality. Accordingly, a small sum-window at this sum will include, when transposed to the X, Y plane, regions of distinct variation in the ratio of carbon-14 pulses to background pulses. Addition of a small maximum differential limit will produce a greatly increased ratio. Such a discrimination characteristic corresponds to the tip of an outer-limit (very low density) contour of the carbon-14 spectrum. In this same region of maximum sums of carbon-14 pulses, the equal-density contours of background pulses constitute relatively parallel lines on either side of the $X=Y$ line.

By extension from the limiting case just discussed, it can be seen that at any point on the signal spectrum of carbon-14 in FIG. 1, the pulses of the given sum which nominally correspond to a given magnitude of scintillation intensity actually are produced by scintillations of a band of intensities. Where the frequency gradient as a function of intensity is large, as in the latter portion of the carbon-14 spectrum of FIG. 1, the equality spectrum typified by FIG. 2 is substantially sharpened for any given sum as compared with the equality spectrum of pulses produced with that same sum by light pulses of uniform intensity distribution. Thus the narrowing of the accepted differential with increasing sum in a manner excluding the outer corners of the hatched acceptance area of FIG. 8 or 9 improves the ratio of acceptance of signal pulses to acceptance of background pulses, in addition to the small improvement of the noise rejection.

As will be evident, the best shaping of the acceptance characteristic in the upper-amplitude region of the isotope to be counted does not correspond to an equal-density contour. Such an acceptance area would be most desirable in any case where all events to be rejected have no density gradient, but constitute a "uniform field" in the region of the boundary. As regards noise, this condition is reasonably met, the gradient as a function of pulse inequality being small in the region of approximately equal pulses of sum well above the "noise region." As regards radiation background, which itself has a probability peak at pulse equality, the shaping of the upper region of accepted sum amplitudes is optimized with the acceptance limit at a substantially higher value of carbon-14 density for equal pulses than for very unequal pulses, i.e., the best discrimination curve tapers from relatively broad to very narrow differential limits much more rapidly than the isotope equal-density curve. Accordingly, the equal-density contour is of primary significance for this purpose only as a general guide to the region in which best shaping should be experimentally determined for each type of counting problem.

From the discussion preceding, it will be seen that the shaping of the upper level of the lower-energy isotope channel in plural-isotope counting is governed by similar general principles, the mechanism of improvement in the lower channel being similar. Thus in the tritium-carbon separation earlier discussed, the most desirable upper tritium boundary will be substantially flatter than the equal-density tritium contour.

It will be observed that in the region of intermediate amplitudes, an equal-density curve of carbon-14 has a configuration generally suggestive of the type of differential limits shown in FIG. 8. (The shape of the various carbon-14 contour curves in the regions of lowermost amplitude of course varies to a considerable degree in any event, but without greatly affecting this approximation of the effect produced by employment of such a discrimination characteristic.) As already stated, the best constant differential limit for noise discrimination varies with the maximum amplitude of the pulses to be counted. Accordingly, if the boundary of the discrimination area is set to correspond to the general shape of an equal-density curve, there is achieved the noise reduction accomplished by the addition of maximum differential discrimination to a conventional sum system, together with the further advantages provided by the appropriate tapering or rounding off of the acceptance area in the region of highest magnitudes, particularly in plural-isotope counting.

In practice, as in prior art equipment, provision must be made for continuous variation of the discrimination level, to permit adjustment by the user for any particular measurement. In the case of the "shaped" acceptance areas of the invention, the rough equivalent of the operation of variation of the discriminators of the prior art (in a horizontal direction in FIG. 1 or 6 or inward or outward from the origin in FIG. 5 or 7) is expansion and contraction of the acceptance area by simultaneous variation of the entire boundary. The invention in a further aspect further provides apparatus constructions whereby the selection of desired acceptance boundaries by the equipment user is accomplished in a manner generally as simple as heretofore the practice in the analogous operation of setting upper and lower levels for counting windows.

If any given discrimination limit in the X, Y plane is approximated as a mathematical function of the two variables, the value of this function can then be calculated from the X and Y outputs of each pulse and compared with a fixed "discrimination level," this comparison being made by simple pulse-height discrimination as heretofore used on one output or on the sumpulse. The form of the carbon-14 equal-density curves may be approximated as a family of segments of ellipses of major axis 2Z and minor axis 2W, where Z is the pulse-sum value to which the curve is tangent at its tip and W is the minor axis or "width" when the curve is extended to intersect with the 45° line parallel to the sum-lines and passing through the origin. The equation of such an ellipse is:

$$\frac{(X+Y)^2}{2Z^2} + \frac{(X-Y)^2}{2W^2} = 1$$

Accordingly ellipses of related form may be constructed to have their tip ends, at equal pulse contributions of X and Y, coincide with any given value of the sum. There is shown in FIG. 14 an acceptance area by two ellipses of a family wherein proportionality is maintained between the parameters Z and W as Z is varied and there is shown in FIG. 15 a family of ellipses meeting this same equation, but with W held constant for all values of Z.

Each of the families of ellipses just described are related to each other by treating Z as the sole independent parameter, with W being proportional to Z in one case and constant in the other. Obviously, an infinity of elliptical shapes can be obtained by varying W independently of Z. For purposes of utilizing the invention in its more general aspects, which include the utilization of such ellipses in relatively complex methods of discrimination, the ellipse parameters may be considered as equally variable. (Further, it will be noted that by moving the center point of the families along the 45° line of pulse equality, there may be obtained narrowing of the permitted differential at low sum values, as may be felt desirable for flexibility in certain cases). However, to obtain the equipment and operational simplicity provided by the narrower aspects of the invention, it is desirable to consider the sole independent variable as Z, with W being considered either a dependent variable or a constant, in establishing the relation of a family of "discrimination level" curves. In this manner it is possible to solve the equation for Z and thus produce an expression for Z in terms of X and Y as the sole variables. Any given coincident X and Y pulses may be identified as lying on the one curve of the family having the corresponding value of Z. By comparison of the Z value with a reference discrimination value, the pulse may be either rejected or passed for counting.

By incorporating the expression for identification of the Z value of the corresponding ellipse in a simple analog computer having the X and Y pulses as inputs, and the Z value pulse as the output, each pair of coincident pulses may be converted to a single pulse of amplitude corresponding to the Z value and accepted or rejected by use of the usual system of upper-level and lower-level (where the lower-level is likewise to be thus shaped) pulse-height discriminators and coincidence circuits. Comparison of the families represented by FIGS. 14 and 15 will show that the latter provides a more satisfactory approximation to the upper contours for both carbon-14 and tritium than the former. By adjusting W to equal the upper-level tritium value of Z, in the case of FIG. 15, or by making the constant unity in the case of FIG. 14, there can be obtained a circular arc suitable for use as the upper-level tritium boundary. However, when dual-isotope measurements are considered, it is seen that such a family as that of FIG. 14 cannot be readily used to form both such a circular arc and at the same time approximate the relatively elongated elliptical shape of the upper carbon-14 boundary.

For the case of the constant-width ellipse family shown in FIG. 15, the equation given above has the following solution for Z:

$$\frac{X+Y}{\sqrt{2-\frac{(X-Y)^2}{W^2}}}$$

Although the analog computation may be performed in a variety of ways known in the computing arts, there is shown for completeness in FIG. 16 a preferred construction described and explained below.

As shown in FIG. 16, the X and Y input pulses are fed to the inverting input of an operational amplifier $A_1$ producing an output pulse of amplitude $-(X+Y)$. The respective input resistors are indicated at $R_1$, $R_2$ and the unity-gain feedback resistor is indicated at $R_3$. (The stabilizing resistors connected to noninverting inputs of the operational amplifiers are omitted on the drawings.)

The X input is also connected to input resistor $R_4$ of an inverting amplifier $A_4$, with unity-gain feedback resistor $R_5$. The output of $A_4$ is added to the Y input, by means of respective input resistors $R_6$ and $R_7$, in an inverting amplifier $A_5$, with unity-gain feedback resistor $R_8$ to produce the pulse amplitude X - Y, a balancing potentiometer $R_{20}$ in series with $R_6$ and $R_7$, producing zero output at zero difference. By means of diodes $D_1$ and $D_2$, this output signal is selectively either to one input resistor $R_9$ or the other input resistor $R_{10}$ of the next stage. If Y is greater than X, the signal is directly fed through diode $D_1$. If X is greater than Y, the signal is fed to the input resistor $R_{11}$ of an inverting amplifier $A_6$, with a unity-gain feedback resistor $R_{12}$. Thus the input signal to the next stage $A_7$ is the negative of the absolute value of the amplitude difference. The feedback resistor $R_{13}$ for $A_7$ is manually variable, and is employed to preset the ellipse width 2W to define the half-width W experimentally found to be closest to optimum for a wide range of measurements on isotopes. The interplay between multiplier gain or amplifier gain and the computing circuit permits, in addition, expansion and contraction of the X and Y axes of FIG. 15 to increase the flexibility of the system in delineating areas of acceptance in the X, Y plane. By fixing the value of $R_{13}$ as a fraction of the value of $R_9$ or $R_{10}$ equal to the reciprocal of W, amplifier $A_7$ is made a divider producing as its output a pulse of amplitude representative of the absolute value of the pulse difference divided by the width W. This latter value is squared by then feeding the pulse to both inputs of a multiplier $M_3$. Although illustrated as a multiplier with two inputs, $M_3$ may of course be a squaring element such as a diode of FET square if the pulses are processed at amplitudes appropriate for the range of such devices. The squared output constitutes one of two additively connected inputs to an inverting amplifier $A_2$ through input resistor $R_{14}$. The second input resistor $R_{15}$ is connected to a constant negative 2-unit reference source. The feedback network of amplifier $A_2$, in addition to the unity-gain feedback resistor $R_{16}$, includes a squaring multiplier $M_1$ so that the output of $A_2$ is the square root of the negative of the sum of the inputs. This square root output constitutes one of the inputs to a multiplier $M_2$ in the feedback network of a further inverting amplifier $A_3$, the input resistor to which, $R_{17}$, is connected to transmit the $-(X+Y)$ pulse at the output of $A_1$ earlier referred to. The resistor element $R_{18}$ of the feedback network of $A_3$ is again of unity gain value. Because the feedback of $A_3$ is multiplied by the square root value output pulse of $A_2$, the inverting amplifier $A_3$ serves as a divider, producing at the output of the overall circuit a pulse of amplitude which is the desired function of the amplitudes of the input pulses as set forth above.

Obviously, the analog circuits must employ amplifiers and multipliers capable of handling the high frequencies present in the scintillation pulses to maintain individual pulse resolution, and must also introduce appropriate delays for proper synchronization. Even further flexibility may be added by replacing the width-adjustment potentiometer $R_{13}$ with, for example, a transistor or similar controlled impedance element which determines the effective ellipse width W differently for each pulse by controlling this in accordance with, for example the value of the sum signal, the relationship being determined by a manual control to permit manual delineation of an essentially infinite variety of ellipselike boundary shapes no longer restricted to any true mathematical ellipse.

It may be mentioned that the portion of the circuit of FIG. 16 consisting of amplifiers $A_1$ and $A_4$ through $A_7$ may be used to generate the skewed difference discrimination of FIG. 9 by simple modification. If variable resistance $R_{13}$ is replaced by the standard value producing unity gain in $A_7$, and a fraction $k$ of the output of $A_1$ is added to the output of $A_7$, there results an output pulse of magnitude $$|X-Y| - k(X+Y)$$

The feeding of this signal to a simple pulse-height discriminator used as an anticoincidence control in the same manner as an upper-level window discriminator produces the skewed difference discrimination which is shown in FIG. 9 as an addition to a conventional pulse-height window, but is also usable along with elliptical discrimination if so desired. It will be observed that if such discrimination is used along with elliptical contour discrimination, with the ellipse of greater width than the narrow portion of the skewed differential acceptance area, the overall acceptance pattern or area will be defined by the skewed difference lines in the lower region of sums up to the point of intersection with the ellipse corresponding to the setting of the upper-level discriminator for the elliptical function and by the elliptical limit for sum values higher than the sum value at the intersection. As in the case of the "pieced" shaping of FIGS. 12 and 13, where a plurality of anticoincidence gating discriminators are used in parallel, the perimeter of the acceptance area will be defined by the lowest limit of differential permitted by any of the superimposed boundary discriminators.

There is shown in FIG. 17 a schematic diagram of an overall three-channel liquid scintillation counting system employing the invention. The system employs the usual balanced multiplier phototubes X and Y at 50 and 52 disposed in the counting chamber receiving the light scintillations from the sample 54. Each of the outputs is suitably amplified (omitted from the drawings along with the conventional delay devices, etc.) and fed to the inputs of the usual threshold coincidence system, which includes discriminators fixing the usual minimum threshold values. In addition, the outputs are fed to the function generator FG1, in this instance the analog computer circuit of FIG. 16, and the output of this function generator is fed in parallel to three counting channels A, B and C, each provided with the usual amplifying stages 58 and 60 and interposed attenuator 62 feeding a discriminator logic system 63 the same as that used in conventional channels, with each having a "window" accepting pulses for counting only within the present limits.

The system as thus far described will be recognized as identical with a conventional summation system, with the sole exception that the function generator FG1 replaces the conventional pulse adder by the function of the two variables which identifies the ellipse corresponding to the tangent sum-value in the X, Y plane, and thus defines an acceptance area for each channel in which the pulses of any given sum are discriminated on the basis of their difference as well as their sum. It will be observed that with the lower level defined by the elliptical function, there are two symmetrical ranges of permitted differential for any given sum, equal pulses being rejected.

As can be seen in FIG. 15, the lower-level ellipse bounding the acceptance area for the lowermost channel can, by adjusting the width control of FIG. 16 to make W substantially greater than Z, be made to approximate a straight sum-line and such discrimination may optionally be employed for lower-level discrimination in single isotope counting. However, better discrimination against noise is obtained by utilizing a separate function generator, shown at FG2, for the lower-level discrimination. One function contour for the lower-level discrimination, mentioned in connection with FIG. 10, is a constant product of the individual pulse amplitudes. Such a function is of course far from optimum performance obtainable, but may be used in function generator FG2 for simplicity of the single multiplier required. The computed value of the function is fed to a third discriminator added to the usual coincidence system 56, which requires a triple coincidence to pass the pulse. This function generation system effectively increases the threshold counting value to a maximum value at the sum corresponding to the minimum possible acceptance sum and gradually reduces the threshold value required from each tube at higher sums. It is of course effective only in a channel where the value of Z is eliminated as a lower-level discrimination criterion by setting of the lower level of the Z window below the equal-pulse threshold fixed by FG2.

Although the use of an analog function generator producing a pulse corresponding to the value of a function of the two variables which takes into account their difference as well as their sum, and one or more discriminators, gives a convenient and simple form of apparatus for utilizing the method aspect of the invention, other types of modification in existing equipment may be employed beyond those earlier described. For example, it may be seen that from the standpoint of the method, the delineation of maximum values of elliptical functions of the two variables may be also described as delineating a threshold value for each tube in accordance with the value of the pulse received from the other tube, or in accordance with the sum. There is shown in FIG. 18 an application of the principle of the invention to an unsummed coincidence system having only one "signal tube." As here shown, the system includes the conventional pair of multipliers 72 and 74, each with a minimum level discriminator 76 and 78 constituting an input to a coincidence circuit 80 controlling the gating at 81 of the operation of discrimination and counting circuits 82 of a single window system. The sole modification of the conventional system is provision for variation of the minimum coincidence-acceptance level of the "coincidence tube" 74 in accordance with the value of the pulse from the signal tube 72. Where the modification of the coincidence threshold of the coincidence tube is a linear function of the pulse amplitude of the signal tube 72, the embodiment of FIG. 18 is in essence the incorporation of maximum differential discrimination in an unsummed system, and any desired "shaping" can be obtained experimentally by nonlinearity of the relation.

In FIG. 19, there is shown a balanced summing system to which the type of threshold variation just mentioned is added symmetrically. The system is generally similar to a conventional balanced sum-discrimination system. However, there are added cross-connections 83 and 84 coupling the respective signals, each to vary the threshold of the other required for acceptable coincidence. As schematically illustrated, clippers 86 and 88 are inserted in these couplings to render them ineffective in the lowest regions of pulse amplitude. Where the threshold variation is linear, the effect is identical with the addition of maximum differential discrimination to a conventional sum system. Indeed, by appropriate shaping of the variation characteristic, the upper-level acceptance in the X, Y plane may be made to conform to elliptical or other shape. For example, if the coincidence threshold for each tube is increased in at least the upper region of sums at a rate which increases the required threshold value of each tube more rapidly than half the increase in sum, the "thresholds" form a closed curve. Although such a utilization of the broader aspects of the invention absorbs into the coincidence threshold circuits the function of upper-level discrimination, permitting counting of all pulses producing coincidence gating, and may be extended to inverse shaping at smallest amplitudes to replace other forms of lower-level discrimination, it does not afford the flexibility and convenience of the preferred forms of the invention earlier described, but will serve as further illustration of the large variety of ways in which the invention can be employed.

Further variations and modifications may be readily devised, An inequality signal may, for example, be employed to vary the upper (or lower) discrimination level of a conventional summed or unsummed system, instead of (or in addition to) varying the coincidence threshold as in FIG. 19. If an inequality signal is employed to lower the upper acceptance level for the sum with increasing differential, the upper sum level of FIG. 8 or FIG. 9 becomes tapered in the general manner already described, and the rate of taper is readily modified by attenuation of the difference signal. This corresponds to an upper limit for the value of $X+Y-k|X-Y|$ in the simple case of linear subtraction from discriminator cutoff bias.

Where great flexibility is provided to the user of equipment in the shaping of the acceptance characteristic, as in the employment of multiple mathematical functions in forming its boundaries, a correspondingly great amount of experimentation is required to reach settings appropriate for various counting conditions. Further, visualization of the meaning of the settings of the various controls in terms of an overall acceptance pattern is extremely difficult. Accordingly, where extensive provision is made for pattern-shaping in a counting system of the invention, some form of visual display is normally desirable. One such form of display is an oscilloscope presentation of dot distribution in the X, Y plane as earlier mentioned, which may be incorporated as part of the counting system and employed to view the discrimination area (only counted pulses recorded) or the entire field (all coincident pulses recorded). Where counting rates are adequate, either pattern may be observed by mere use of a long-persistence screen, but more elaborate provision may be made, such as use of a memory tube, if the employment of photographic technique is deemed inconvenient and counting rates are low. As a variant, probably more readily understandable to technician operators, the display may use as the rectangular coordinates (the oscilloscope deflection inputs) the sum and difference signals, thus producing, in essence, a pattern analogous to a folding of the symmetrical X, Y plane patterns of the drawing along the 45° line of pulse equality.

Desirably adjustments are not required to be made by the user. The principles already discussed permit the design of circuits wherein the full benefits of the invention may be automatically obtained for samples which are substantially unquenched, but the advantages of the shaping at the upper end of each isotope boundary in discriminating against scintillation background (background radiation or higher isotope) are lost for highly quenched samples unless provision is made for restoring the "register" between the discrimination pattern and the sample spectrum in response to a preliminary quench correction measurement on each sample. Alteration of photomultiplier gain will to some extent restore the desired relation, but not wholly.

Substantial simplification of the adjustment requirements, manual or automatic, can be made by employing a permanent-adjustment noise-rejection circuit for the entire instrument range, starting just below the upper end of the tritium spectrum, and employing one or more elliptical function generators, or other suitable circuits, only for the shaping of the upper (and lower where a lower-energy isotope is also present) "level."

A single setting for the maximum-inequality discrimination of FIG. 9 which "skims" the extreme edge of an equal-density carbon contour representing a very low counting rate is essentially "universal" in improving noise-rejection for all isotopes and degrees of sample quenching. If an elliptical or analogous rejection characteristic is substituted for mere sum discrimination in defining the upper or lower level of FIG. 9, the shape of the substituted characteristic in regions falling outside the skew differential discriminator limits is of no consequence. An automatic counting system designed for commercial use of the invention accordingly employs the acceptance characteristic of FIG. 9, but is adapted for the addition of the upper and lower level shaping refinements in one or more counting channels when these are further developed for fully advantageous use with samples of widely varying quench properties in an automated system and has certain further novel advantageous features.

A block diagram of this commercial system is shown fragmentarily in FIG. 20, portions of the system not illustrated being essentially identical with corresponding portions of the diagram of FIG. 17. Except for the addition of an analog computer of function generator 90, and a modification of the coincidence logic 92 to produce an output pulse only when the output of the function generator 90 is lower than a limit L (indicated by the logic legend X Y L), the diagram is that of a conventional pulse-summation system, the conventional summing for the signal which is to be amplified and discriminated in the respective signal channels being shown at 94. Except for the function generator 90, all portions of the circuit are of the type well known.

A circuit diagram of the function generator 90 of FIG. 20 is shown in FIG. 21. The negative X and Y inputs (from a suitable preamplifier) are fed to the circuit in two paths. The first input path, through respective capacitors C3 and C25 and resistors R22 and R23, is to the portion of the circuit which produces an output pulse proportional to the absolute value of the difference, this being the circuit of transistors Q13 through Q19, now to be described.

The Y pulse is amplified and appropriately stretched in duration in a two-stage negative-feedback amplifier employing complementary transistors Q16 and Q17. Q16 is a grounded-emitter PNP with the base bias fixed by resistor R37 connected to the positive supply and negative feedback resistor R41. The collector resistor R42 is connected to the negative supply. The second-stage NPN transistor Q17 has its collector resistor R40 connected to the positive supply and its emitter resistor R43 connected to the negative supply, its base being direct-coupled to the collector of Q16. A high-frequency bypass capacitor C38 shunts the feedback resistor R41 connected between the emitter of Q17 and the base of Q16 to delay the pulses. The negative pulse output of the amplifier is brought out through capacitor C32 connected to the collector of Q17.

The amplifier for the X signal has stages Q14 and Q15 essentially identical with the corresponding stages Q16 and Q17, but with all polarities reversed. The symmetrical complementary balance of the amplifiers is maintained throughout, the collector resistor R29 and the base bias resistor R32 of NPN Q14 being of the same values as the corresponding components of PNP Q16. Similarly, the values and connections of the emitter resistor R34, the collector resistor R36, and the output capacitor C30 of the PNP-transistor at Q15 are identical to those of the NPN-transistor Q17. The feedback network R33 and C28 of this circuit is likewise the same, with the exception that the capacitor C28 is made variable to permit adjustment of the pulse delay. The negative X input is not directly to the amplifier Q14, an inverter stage Q13 being inserted to render the outputs subtractive. The inverter stage Q13 is a PNP operated with grounded emitter and having the base and collector, respectively, connected to the junction points of bias resistor R27, feedback resistor R28 and collector resistor R31 connected between the positive and negative supplies. The output of the unity gain inverter is through a capacitor C26 and a resistor R30 to the base of Q14.

The positive and negative supplies are provided with filters R44 and C31 and R50 and C27 to isolate the amplifiers from the following stages. The positive pulse output from Q15 is through a capacitor C30 which is connected to capacitor C32 to produce a difference current at the junction. A balancing network, consisting of capacitors C29 and C37, resistors R35 and R39, and a center potentiometer R38, having its tap grounded, is connected between the emitters of Q15 and Q17 to eliminate any residual unbalance. The circuit is balanced by adjusting R38 to produce maximum counting-rate, i.e., minimum tripping of the limit discriminator inhibiting the coincidence system; in this manner any slight unbalance of either amplifier gain or photomultiplier gain is simply compensated by utilizing the inherent properties of the system.

The net current output of the amplifiers appears at the junction of oppositely polarized diodes CR11 and CR12. When X is smaller than Y, conduction is through CR11, which is at the input to a current inversion amplifier consisting of Q18 and Q19, again of complementary construction. The current input is to the base of Q18, of which the emitter is grounded and the collector resistor R51 is connected to the negative supply. The base of Q19 is direct-coupled to the collector Q18 and its collector is connected to the positive supply, its emitter being connected to the negative supply by emitter resistor R52. The emitter of Q19 is connected to the input at the base of Q18 through a resistor R47 and a parallel stretching network R46 and C33, a small bypass capacitor C34 shunting this network. These elements, along with a resistor R45, connected to the positive supply, also fix the base bias of Q18. Output of Q19 is through a resistor R48 and capacitor C39 to the emitter of a summing-circuit transistor Q20. If X is greater than Y, the inverter circuit of Q18 and Q19 is inactive, and the difference current from the X and Y amplifiers flows through CR12 and capacitor C40 to the summing circuit input. A high-value resistor R49, connected to the negative supply, maintains the diode CR12 at appropriate potential to equalize the operating conditions of the oppositely connected diodes CR11 and CR12.

It will thus be seen that the output of the circuit thus far described is a multiple of the absolute difference between the X and Y pulses, the sign of the difference determining whether the output current is fed through capacitor C39 or C40. A diode CR14 bypasses any reverse-polarity component of the input to the summing amplifier Q20.

The individual pulses from X and Y are also fed to the emitter of summing amplifier Q20, through respective resistors R24 and R25 and respective capacitors C4 and C12. The emitter resistor of NPN Q20, which is operated with grounded base, is connected to the negative supply, and a small capacitor C11 shunts the emitter to ground. The collector resistor R60 is connected to the positive supply and the collector is also connected through a diode CR47 to a tap on the positive supply.

With this summing amplifier arrangement, the currents from the X and Y inputs and the amplified difference current produced by the input corresponding to the sign of the difference are added, and the desired function appears as a voltage across resistor R60 which is fed to a conventional discriminator circuit (included in FIG. 20 as part of the coincidence logic). Each term of the function of course has a multiplier determined in one case by the gain and in the other by the attenuation, in the handling of the original X and Y signals.

For the purposes later to be mentioned, an output line bearing the difference signal −(X−Y) at the junction of diodes CR11 and CR12 is connected to the base of an auxiliary output amplifier Q21.

With the circuit as thus constructed, there results a discrimination system which does not permit counting of any coincident pulses which do not meet the requirement that the absolute value of the difference minus a constant times the sum not exceed a given limit. As will be seen from FIG. 9, the fixing of this limit determines the minimum pulse-sum at which this portion of the discrimination becomes effective (generally corresponding, in most cases, to the upper region of the tritium spectrum) and the ratio of the gain produced for the absolute difference signal to the attenuation produced for the sum signal at the input to the final summing amplifier determines the slop or "skewness" of the differential limit. It is not found necessary to provide any control-panel adjustments with appropriate experimental design selection of the circuit values for any particular phototube system. The gain of the photomultipliers may be adjusted by the conventionally-provided adjustment of the high voltage to correct any small deviations in the effectiveness of the system from one isotope to another, if the user so desires.

A set of components for the circuit of FIG. 21, which has been found to produce a high degree of improvement with any of the photomultiplier types commonly used in liquid scintillation counting, is:

Transistors:
    Q13, Q15, Q16, Q18—Motorola MPS6523
    Q14, Q17, Q19, Q20, Q21—Motorola MPS6521

Resistors (ohms—asterisks indicate 1%):

| R22 4.99K* | R34 2.2K | R45 10K |
| R23 4.99K* | R35 169* | R46 6.2K |
| R24 825* | R36 1.5K | R46 316* |
| R25 825* | R37 12K | R48 316* |
| R27 4.7K | R38 100 | R49 1.2M |
| R28 2.0K* | R39 169* | R50 100 |
| R 29 3.3K | R40 1.5K | R51 4.7K |
| R30 2.0K* | R41 6.34K* | R52 1.0K |
| R31 1.0K | R42 3.3K | R53 10K |
| R32 12K | R43 2.2K | R60 4.99K* |
| R33 6.34K* | R44 100 | |

Capacitors (mf. except as stated):

| C3 0.47 | C30 0.05 |
| C4 0.47 | C32 0.05 |
| C11 500 pf. | C33 0.47 |
| C12 0.47 | C35 0.1 |
| C25 0.47 | C37 0.47 |
| C26 0.47 | C38 5 pf. |
| C27 1.0 | C39 0.47 |
| C28 5–18 pf. | C41 0.1 |
| C29 0.47 | C34 10 pf. |

Diodes: 1N916 except CR14 (979).
Power supply: 12 volts, positive and negative.

With addition of the embodiment of the invention just described, it is found that there can be achieved an improvement in the neighborhood of 40 percent in the $E^2/B$ ratio in the counting of carbon-14 with a high-grade summation system, with lesser, but nevertheless appreciable, improvement in the counting of other isotopes. With one system, the best obtainable ratio of the square of efficiency (percent efficiency multiplied by 100) to background (in counts per minute) for carbon-14 without the improvement was 350 and, after the addition of the present discrimination system, was 520, these measurements being made for a window of 20 to 1 range at the "balance point" (the point of equal efficiency gradient at each extreme of the window, commonly used to minimize the effects of small shifts).

If so desired, the auxiliary signal from transistor Q21 of FIG. 21 may be employed for the addition of further auxiliary refinements. With the circuit illustrated, the auxiliary output signal, representing the potential at the takeoff point, has an amplitude bearing a logarithmic relation to the actual difference signal because of the fact that it is a characteristic of the diodes CR11 and CR12 that the voltage drop is a logarithmic function of the current. For many uses, reconversion to linearity is desirable. However, if this logarithmic signal be doubled before conversion, and then converted to linearity, the resultant amplitude will be the square of the difference, which may thereupon be employed in the generation of an elliptical characteristic in any one or more of the individual energy channels, which already have the sum signal and thus may be readily modified for this purpose. Obviously, a similar takeoff can be made linearly if desired, by suitable redesign.

The comparison of the individual amplitudes to distinguish, on a probability basis, between events producing pulses of the same sum, which is the essence of the invention in its broader aspects, can also be advantageously employed in connection with quench correction. A known imperfection of present quench correction measurements lies in the inability to distinguish between quenching effects produced by various types of internal properties of the sample. The accuracy of the most convenient present quench correction measurements relies on the user's knowledge of the factors producing the quench. The relative pulse-height information may be seen to be usable in establishing such distinction. Certain forms of quenching, for example, may affect only the intensity of the emitter light, by absorbing the beta-ray energy, without producing substantial attenuation of the light produced. On the other hand, another form of quenching is mere unclarity of the fluid, attenuating the light. It will be seen that scintillations occurring near the wall of a sample-bottle should produce, for any given sum, a substantially different probability distribution like that of FIG. 2 for one type of quench than for the other. In the case of the light-attenuation, the effect of quenching will be to flatten the peak at equality, and indeed (to take an extreme example for explanatory purposes) may produce separate peaks at symmetrical values of inequality. By adding to a counting system with a quench correction a provision for measuring such shifts in the equality spectrum, statistical isolation may be produced between quenching produced by one cause and quenching produced by another. This may of course be implemented in a large variety of ways. As one example, there may be added to any system a provision for separately counting the pulses which fall within and without particular differential limits. The ratio of the "channels" thus formed, and its relation to the gross quench, may be employed to identify, by usual calibration procedure, the type of quench producing the spectrum shift shown by, for example, a conventional "channels ratio" quench measurement. The conventional quench measurement may thus be calibrated, by use of known samples, in terms of the quench correction indicated for the particular type (or types) of quenching indicated by the "equal-unequal" ratio, rather than employing only a cause-independent "universal" quench correction with samples of unknown or mixed quench effects. In brief, the required quench correction may be more accurately indicated by a combination of the two measurements than by the present quench correction measurement alone. With the same general effect, the counting rate within a narrow differential limit at equality may be compared with the overall counting rate for identification of the quench type, or other variants may be employed.

Obviously, utilization of the invention is not limited to the two-tube coincidence systems now universally used, but can be employed with more than two tubes if and when it is desired to build systems employing more than two tubes for forming coincidences, as has long been an obvious manner of noise reduction. Indeed, the present invention greatly increases the noise-discrimination benefits obtained by adding further coincidence tubes. Prior to the present invention, the benefits of having a third coincidence tube were severely limited by the occurrence of what may be termed "false" coincidental noise pulses actually having the pulse in one tube caused by a noise event in the other. The addition of a further coincidence tube heretofore gained nothing as regards such pulses. With the relative value discrimination of the invention, the bulk of such pulses is eliminated from the count in any event, and it becomes possible to utilize the theoretical advantages of addition of a further tube in eliminating coincidences arising from truly random noise pulses in each tube, thus enabling major increase in the tritium-to-noise ratio.

Many other uses for the information contained in the equality distribution of pulses of any given sum or range of sums, concerning identification or more exact identification of the nature of the events counted, will be found as the teachings of the invention are hereafter utilized in various forms. Accordingly, the scope of the invention should be in no way limited by the particular embodiments herein illustrated and described, or the manner in which they are presently used.

What is claimed is:

1. In the method of radioactivity measurement which comprises:
   a. exposing a plurality of photomultipliers to scintillations produced in response to the activity under measurement to produce a plurality of pulse outputs, and
   b. selectively processing the pulse outputs to produce measurement indications representative of coincident pulses of predetermined amplitude characteristics,
   the improvement in the selective processing characterized by:
   c. discriminating on a probability basis between pulses caused by differing events by accepting and rejecting coincident pulses of any given sum in accordance with the relative contribution of the individual pulses to the sum, the minimum individual pulse required for acceptance of pulses of some sums being substantially greater than the minimum individual pulse required for the acceptance of pulses of other sums.

2. The method of claim 1 wherein only pulses of a predetermined minimum degree of equality are accepted, to discriminate against noise.

3. The method of claim 2 wherein the minimum degree of pulse equality for each sum, over a range of sums, is selected to maintain the ratio of the relative probabilities for the differing events generally constant over the range.

4. The method of claim 1 wherein the differing events are beta emissions of different isotopes.

5. The method of claim 1 wherein one of the differing events is the beta emission of tritium, and pulses are accepted or rejected generally in accordance with relation of the sum of the squares of the amplitudes of the pulses to a particular value.

6. The method of claim 1 wherein one of the differing events is the beta emission of carbon-14, and pulses are accepted or rejected in accordance with the relation of an elliptical function of the pulse values as independent variables to a predetermined value.

7. The method of claim 1 wherein over a range of sums to be counted, the minimum individual pulse required for acceptance continuously increases with increasing sum.

8. In liquid scintillation counting apparatus comprising a chamber adapted to receive a sample to be measured, first and second photomultipliers responsive to scintillations occurring in the chamber and producing electrical signal pulses having an amplitude distribution generally corresponding to the energy distribution of said scintillations, and means coupled to said photoelectric devices for providing a measurement count characteristic of the sample, including discriminating means establishing a minimum limit for the amplitude of the pulse from each photomultiplier required for the counting of coincident pulses, the improvement wherein the value of the minimum limit for the pulses from at least one photomultiplier varies with, and in the same direction as, the amplitude of the coincident pulses from another photomultiplier over a substantial range of amplitudes.

9. The apparatus of claim 8 wherein the discriminating means includes means for summing the coincident pulses and means for limiting the permitted difference of pulses of any given sum.

10. The apparatus of claim 8 wherein the discriminating means includes means for subtracting the values of the pulses.

11. The apparatus of claim 9 wherein the limit of permitted difference is the same for a substantial range of sums.

12. The apparatus of claim 9 wherein the limit of difference is an increasing function of the sum.

13. The apparatus of claim 9 wherein the permitted difference diminishes with increasing value of the sum over a range of sums beyond which all pulses are rejected.

14. The apparatus of claim 9 wherein the minimum limit varies with, and in the same direction as, the sum over a range of upper sums and varies with, but opposite to, the sum in a lowermost region of sums.

15. The apparatus of claim 9 wherein the discriminating means includes means for establishing a discrimination limit having a maximum sum value when the pulses are equal, and having limits of difference for lower sum values satisfying the equation $$\frac{(X+Y)^2}{2Z^2}+\frac{(X-Y)^2}{2W^2}=1$$

where X and Y are the individual pulse amplitudes, Z is the value of the sum when the pulses are equal, and W is a selected constant.

16. The apparatus of claim 15 having means to vary and select the values of Z and W.

17. The apparatus of claim 16 wherein the discriminating means include an analog computer having the individual pulses as inputs and producing therefrom an output pulse identifying the value of Z, and amplitude discrimination means receiving the output pulse.

18. The apparatus of claim 9 including an analog function generator having the individual pulses as inputs and producing an output pulse which is a function of both the sum and the relative values of the individual pulses.

19. The apparatus of claim 18 wherein the output pulse is of an amplitude which is a function of the sum and the absolute value of the difference of the input pulses.

20. In apparatus for scintillation counting including
   a. a plurality of photomultipliers exposed to the scintillations to be counted and
   b. pulse-height analysis means to select coincident pulses for counting in accordance with amplitude characteristics including means to reject all pulses below a predetermined amplitude from each photomultiplier,
   the improvement wherein the analysis means further comprises:
   c. means to compare the amplitudes of coincident pulses from the respective multipliers which are above the predetermined amplitude and
   d. means to select and reject coincident pulses for counting at least partially in response to such comparison.

21. The apparatus of claim 20 wherein the comparing means includes means to produce pulses of amplitude representative of the inequality.

22. The apparatus of claim 21 further including means to additively combine the coincident pulses to produce pulses of amplitude proportional to the sum, means to combine the sum and inequality pulses to produce pulses of amplitude which is a function of both the sum and the inequality, and means to select pulses for counting in accordance with the last-said amplitude.

23. The apparatus of claim 22 wherein the last-said amplitude is proportional to $$|x-Y|-k(X+Y)$$ where X and Y are the individual pulse amplitudes and k is a fraction.

24. The apparatus of claim 20 wherein the inequality pulse-producing means includes means to subtractively combine the coincident pulses to produce pulses of amplitude proportional to the difference.

25. The apparatus of claim 24 including means to reverse the polarity of only one of the pulses, and generally identical means for amplifying each of the pulses and feeding them to a common output in opposed polarity.

26. The apparatus of claim 25 having only one such common output, and having oppositely poled rectifier means coupling the common output to a further output through respective parallel paths, only one of such paths including polarity inversion means, so that the pulse at the said further output is always of the same polarity and is of amplitude proportional to the absolute value of the difference.

27. The apparatus of claim 26 having means to additively combine each pulse appearing at the further output with at least one pulse signal of opposite polarity aggregately proportional to the sum of the corresponding coincident multiplier pulses, to produce a pulse of amplitude proportional to $$|X-Y|-k(X+Y)$$

where X and Y are the individual multiplier pulse amplitudes and $k$ is a fraction.

28. The apparatus of claim 20 wherein the means to select and reject pulses at least partially in response to the comparison is responsive only to coincident pulses of which at least one is substantially in excess of said predetermined amplitude, so that counting of coincident pulses all of small amplitude is unaffected.

29. The apparatus of claim 28 including means to reject coincident pulses of greater than a predetermined total amplitude when the inequality of individual amplitudes exceeds a predetermined level.

30. The apparatus of claim 29 wherein the predetermined level of inequality varies with the total amplitude.

31. THe apparatus of claim 30 wherein the variation is linear, and having means independent of the comparing means for rejecting pulses of a sum beyond selectable upper and lower levels, so that discrimination against noise pulses may be optimized for any selected region of scintillation intensities by adjustment of photomultiplier gain.

* * * * *